(12) United States Patent
Feldman (10) Patent No.: US 11,112,592 B2
(45) Date of Patent: Sep. 7, 2021

(54) FINE FOCUS MICROSCOPE CONTROL

(71) Applicant: BOARD OF SUPERVISORS OF LOUISIANA STATE UNIVERSITY AND AGRICULTURAL AND MECHANICAL COLLEGE, Baton Rouge, LA (US)

(72) Inventor: Martin Feldman, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 15/136,465

(22) Filed: Apr. 22, 2016

(65) Prior Publication Data

US 2016/0313546 A1 Oct. 27, 2016

Related U.S. Application Data

(60) Provisional application No. 62/152,557, filed on Apr. 24, 2015.

(51) Int. Cl.
*G02B 21/24* (2006.01)
*G01J 3/02* (2006.01)
(Continued)

(52) U.S. Cl.
CPC .......... *G02B 21/242* (2013.01); *G01J 3/0208* (2013.01); *G01J 3/0237* (2013.01);
(Continued)

(58) Field of Classification Search
CPC ............ G02B 21/0004; G02B 21/0008; G02B 21/02; G02B 21/025; G02B 21/24;
(Continued)

(56) References Cited

U.S. PATENT DOCUMENTS 2,363,409 A * 11/1944 Gibson ................ G02B 21/241
 310/328
2,428,719 A 10/1947 Nemeth
(Continued)

FOREIGN PATENT DOCUMENTS

EP 0154473 A2 9/1985
EP 0675381 A2 10/1995

*Primary Examiner* — Violeta A Prieto
(74) *Attorney, Agent, or Firm* — Thomas | Horstemeyer, LLP (57) ABSTRACT

According to some embodiments of the present invention, a fine focus microscope includes an objective lens for collecting light from an object being imaged, and a tube lens for forming a first image from light received from the objective lens. The fine focus microscope further includes a fine focus lens for forming a second image from the first image, and an eyepiece for forming a third image from the second image, wherein the third image is viewable by a user. The fine focus microscope further includes a field lens for directing light from the second image to the eyepiece, and a positioning system mechanically coupled to the fine focus lens, the eyepiece, and the field lens. The positioning system changes a position of the fine focus lens, the eyepiece, and the field lens with respect to the objective lens to provide a change in focus of the object being imaged.

7 Claims, 7 Drawing Sheets

(51) Int. Cl.
*G01B 21/02* (2006.01)
*G02B 21/02* (2006.01)
*G01J 3/44* (2006.01)
*G01N 21/65* (2006.01)

(52) U.S. Cl.
CPC ........... *G01J 3/0256* (2013.01); *G01J 3/0272* (2013.01); *G01J 3/44* (2013.01); *G02B 21/02* (2013.01); *G01N 21/658* (2013.01)

(58) Field of Classification Search
CPC .... G02B 21/241; G02B 21/242; G02B 21/36; G02B 21/361; G02B 21/362; G02B 21/364; G02B 15/14; G02B 15/15; G02B 15/155; G02B 15/16; G02B 15/161; G02B 15/163; G02B 15/167; G02B 15/17; G02B 15/173; G02B 15/177; G02B 15/20; G02B 15/22; G02B 15/24; G02B 15/26; G02B 15/28
See application file for complete search history.

(56) References Cited

U.S. PATENT DOCUMENTS

| | | | |
|---|---|---|---|
| 4,020,705 A | 5/1977 | Hayasaka | |
| 4,083,256 A | 4/1978 | Shio | |
| 4,208,089 A * | 6/1980 | Netto | G02B 7/22 359/363 |
| 4,482,221 A | 11/1984 | Clark | |
| 5,024,513 A * | 6/1991 | Hayashi | G02B 21/24 359/379 |
| 5,054,896 A * | 10/1991 | Margolis | G02B 15/15 359/379 |
| 5,515,201 A * | 5/1996 | Omi | G02B 21/0008 359/368 |
| 5,519,531 A * | 5/1996 | Sato | G02B 21/24 359/268 |
| 5,655,419 A | 8/1997 | Aoki | |
| 5,777,783 A * | 7/1998 | Endou | G02B 21/36 359/363 |
| 6,512,632 B2 | 1/2003 | Yamamoto | |
| 6,721,094 B1 * | 4/2004 | Sinclair | G01B 9/04 356/445 |
| 6,961,188 B2 * | 11/2005 | Betensky | G02B 15/12 359/676 |
| 7,009,765 B2 * | 3/2006 | Gohman | G02B 13/16 359/434 |
| 7,218,446 B2 | 5/2007 | Dixon et al. | |
| 7,768,715 B2 * | 8/2010 | Gohman | G02B 15/177 359/676 |
| 2004/0141231 A1 * | 7/2004 | Hund | G02B 7/24 359/384 |
| 2005/0111096 A1 * | 5/2005 | Roeth | G02B 21/242 359/393 |
| 2008/0198451 A1 * | 8/2008 | Gohman | G02B 7/102 359/432 |
| 2010/0110568 A1 * | 5/2010 | Margolis | G02B 7/04 359/744 |
| 2012/0062723 A1 * | 3/2012 | Ghosh | G02B 21/16 348/79 |
| 2013/0342902 A1 * | 12/2013 | Krueger | G02B 21/245 359/383 |
| 2019/0075247 A1 * | 3/2019 | Vink | G06T 5/50 |
| 2019/0285835 A1 * | 9/2019 | Putman | G06T 7/80 |

* cited by examiner

FINE FOCUS MICROSCOPE CONTROL

This application claims priority to U.S. Provisional Application No. 62/152,557 filed Apr. 24, 2015, the entire content of which is hereby incorporated by reference.

This invention was made with government support under Contract No. 1R03EB012519-01A1 awarded by the National Institutes of Health. The government has certain rights in this invention.

BACKGROUND

1. Technical Field

The field of the currently claimed embodiments of this invention relates to microscopes, and more particularly to fine focus microscope control.

2. Discussion of Related Art

In a conventional microscope a specimen is placed on a stage in a field of view of an objective lens. The objective lens collects light from the specimen and an image is formed at a field lens. This image is then viewed by the eyepiece. The focus of the image is a very strong function of the position of the objective lens, and a precision mechanical structure is required in the stage and the focusing mechanism.

Figure 1:
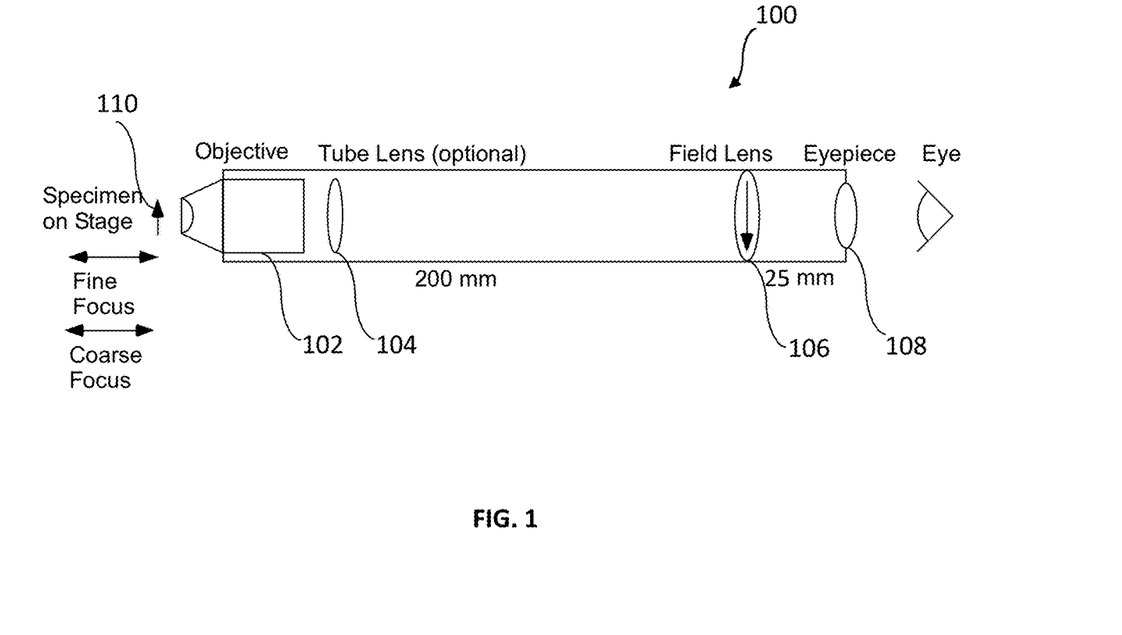
FIG. 1 is a schematic illustration of a conventional microscope.

FIG. 1 is a schematic illustration of a conventional microscope. The microscope 100 comprises an objective lens 102, a tube lens 104, a field lens 106, and an eyepiece 108. Many microscope objectives, such as the objective lens 102 in FIG. 1, are designed to produce their best image at infinity. An "infinity corrected" objective lens 102 is used with a tube lens 104. For example, with a 100× objective lens 102, a typical tube lens 104 with a focal length of 200 mm produces an image with 100× magnification at the field lens 106, which is located 200 mm distant. Ideally the field lens 106 does not affect the image, but increases the field of view by directing the light through the eyepiece 108, which acts as a magnifying lens. Other microscopes omit the tube lens 104 and the objective lens 102 forms an image directly on the field lens 106. A 10× eyepiece 108 typically has a focal length of about 25 mm and is situated roughly 25 mm from the field lens 106, producing an additional magnification of 10×.

The image at the field lens 106 is brought into focus by changing the position of the objective lens 102 with respect to the specimen 110. In some microscopes this is accomplished by moving the objective lens 102, tube lens 104, field lens 106, and eyepiece 108, while keeping the stage on which the specimen 110 is located stationary. Many microscopes are designed with focus knobs that change the position of the stage, while keeping the remaining components of the microscope fixed. Coarse and fine focus knobs facilitate coarse and fine adjustments of the position of the stage. However, when objectives with high magnification are used, for example, 100×, small changes in the position of the stage result in large changes in the focus of the image. Accordingly, highly sensitive mechanical systems are required to obtain precise changes in focus. These systems add to the cost of the microscope, and limit the precision with which changes in focus can be made.

SUMMARY

According to some embodiments of the present invention, a fine focus microscope includes an objective lens for collecting light from an object being imaged, and a tube lens for forming a first image from light received from the objective lens. The fine focus microscope further includes a fine focus lens for forming a second image from the first image, and an eyepiece for forming a third image from the second image, wherein the third image is viewable by a user. The fine focus microscope further includes a field lens for directing light from the second image to the eyepiece, and a positioning system mechanically coupled to the fine focus lens, the eyepiece, and the field lens. The positioning system changes a position of the fine focus lens, the eyepiece, and the field lens with respect to the objective lens to provide a change in focus of the object being imaged.

According to some embodiments of the present invention, a probe for surface-enhanced Raman spectroscopy includes a gradient-index (GRIN) lens having a proximal end and a distal end, and a rough metallic surface spaced apart from the distal end of the GRIN lens and in an optical path of the GRIN lens. A transparent substrate is disposed between the distal end of the GRIN lens and the rough metallic surface to maintain a distance from the distal end of the GRIN lens to the rough metallic surface. A fine focus lens is spaced apart from the proximal end of the GRIN lens, wherein a change in position of the fine focus lens provides a change in focus of light at the rough metallic surface.

According to some embodiments, the Raman Spectroscopy probe further comprising a positioning system mechanically coupled to the GRIN lens and the fine focus lens, wherein the positioning system changes a position of the fine focus lens with respect to the GRIN lens to provide the change in focus of light at the rough metallic surface.

According to some embodiments of the present invention, a method for fine focus control in a microscope comprising an objective lens, a tube lens, a field lens, and an eyepiece includes disposing a fine focus lens between and in an optical path of the tube lens and the field lens. The method further includes adjusting a position of the fine focus lens, the field lens, and the eyepiece at least one of farther away from or closer to the tube lens to change a focus of an object being imaged.

According to some embodiments of the present invention, a method for fine focus control in a Raman spectroscopy probe comprising a gradient-index (GRIN) lens, a transparent substrate, and a rough metallic surface includes providing a fine focus lens spaced apart from a proximal end of the GRIN lens. The method further includes adjusting a position of the fine focus lens to change a focus of light at the rough metallic surface.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "light" as used herein is intended to have a broad meaning that can include both visible and non-visible regions of the electromagnetic spectrum. For example, visible, near infrared, infrared and ultraviolet light are all considered as being within the broad definition of the term "light."

Some embodiments of the current invention are directed to a fine focus microscope. A conventional microscope includes an objective lens and sometimes a tube lens for forming an image of an object at a field lens, and an eyepiece for forming an image of the object that is viewable by a user. According to some embodiments of the present invention, a fine focus microscope includes a tube lens which forms a first image, and a fine focus lens which forms a second image of the first image at the field lens. A change of position of the fine focus lens provides a change in focus of the image. The fine focus lens enables a user to make precise adjustments to the focus of an image without requiring high precision mechanical structures for moving the stage on which the specimen is placed. Some embodiments of the current invention employ an objective lens, a tube lens, a fine focus lens, a field lens, and an eyepiece. Some embodiments of the current invention comprise a gradient-index (GRIN) lens instead of an objective lens. Methods for achieving fine focus control in a microscope are also provided.

Some embodiments of the current invention are directed to a probe for surface-enhanced Raman spectrometry. The probe comprises a gradient index lens, a rough metallic surface, and a transparent substrate between the gradient index lens and the rough metallic surface. A fine focus lens is used to direct light from a light source through the gradient index lens so that the light is focused at the rough metallic surface. Methods for focusing a probe for surface-enhanced Raman spectroscopy are also provided. Focusing the probe by positioning an additional lens has been experimentally shown to be much easier to accomplish than adjusting the space between the GRIN lens and the rough metallic surface.

Figure 2:
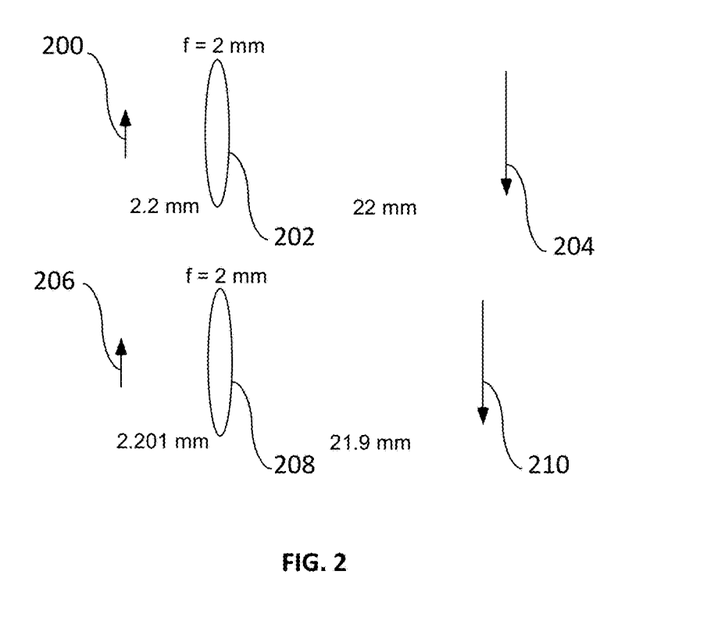
FIG. 2 shows an object and image for two different positions of the object with respect to a lens.

FIG. 2 illustrates image focusing concepts related to embodiments of the present invention. The top diagram in FIG. 2 shows an object 200 and a 2 mm focal length lens 202 forming an image 204 with a 10× magnification. In the bottom diagram the object 206 has been moved 1 µm farther from the lens 208, from a distance of 2.2 mm to a distance of 2.201 mm. The shift in position of the corresponding image 210 is from 22 mm to 21.9 mm, a distance of 100 µm. Conventional microscopes focus an image by adjusting the distance between the object and the objective lens. However, as is evident from FIG. 2, small changes in the object-objective lens distance result in much larger changes in the focus. For a 100× objective lens operating at about a 200 mm conjugate, the difference in distances is a hundred-fold and the axial magnification is 10,000 (the square of the transverse magnification). Accordingly, highly sensitive mechanical adjustment mechanisms are required to make minute changes in the position of the stage on which the object is placed.

Figure 3:
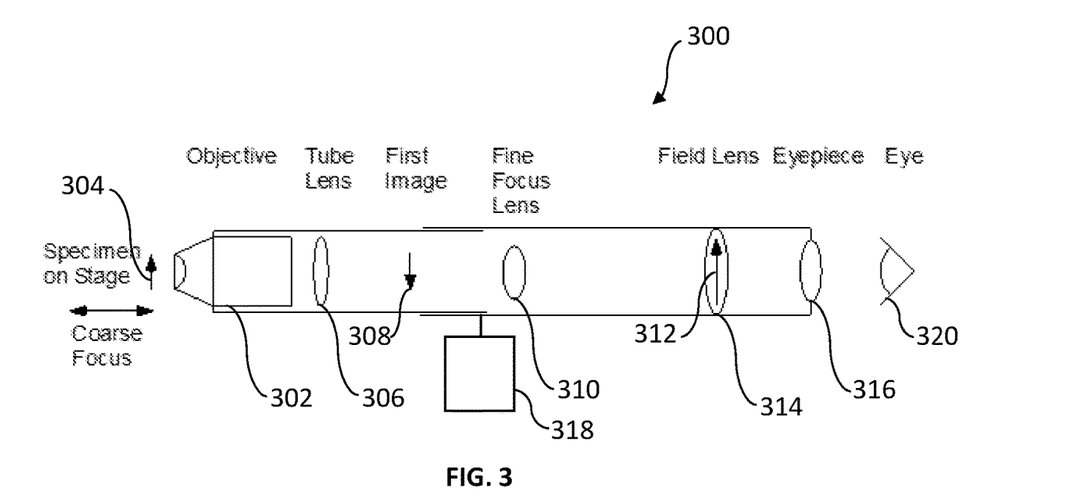
FIG. 3 is a schematic illustration of a fine focus microscope according to some embodiments of the invention.

The present devices and methods reduce the dependence on the mechanical stage adjustment mechanism by positioning an additional lens in the optical path of the objective lens, on the opposite side of the objective lens from the stage. FIG. 3 is a schematic illustration of a fine focus microscope 300 according to some embodiments of the invention. The fine focus microscope 300 comprises an objective lens 302 for collecting light from an object 304 being imaged, and a tube lens 306 for forming a first image 308 from light received from the objective lens 302. The fine focus microscope 300 further includes a fine focus lens 310 for forming a second image 312 from the first image 308 at a field lens 314, and an eyepiece 316 for forming a third image from the second image 312, wherein the third image is viewable by a user. A field lens 314 directs light from the second image 312 to the eyepiece 316. A positioning system 318 is mechanically coupled to the fine focus lens 310, the eyepiece 316, and the field lens 314. The positioning system 318 changes a position of the fine focus lens 310, the eyepiece 316, and the field lens 314 with respect to said objective lens 302 to provide a change in focus of the object 304 being imaged.

In the embodiments described herein, the tube lens 306 is not strictly necessary if the objective lens 302 can form a first image relatively close to it, so the fine focus lens 310 can then image the first image 308 to a second focus on the field lens 314. However, the performance of current high quality objectives would degrade if used this way. According to some embodiments of the invention, the fine focus lens 310 relays the image 308 formed by the objective lens 302 and the tube lens 306, if present, to the field lens 314 with an axial magnification. Because of the axial magnification, the focus of the image 310 formed at the field lens 314 is a much less strong function of the position of the fine focus lens 310. Consequently the mechanical requirements on the stage and the focusing mechanism are greatly reduced. In addition, this combination may be used to obtain extra magnification. However, it is likely to be empty magnification since the resolution may be set by the numerical aperture of the objective lens 302. In addition, the microscope 300 with the fine focus lens 310 provides the user 320 with an upright image, rather than the customary inverted image. While the embodiments described herein refer to an image to be viewed by a user, the microscope images can also be formed in a camera, instead of or in addition to being viewed directly by an observer.

According to some embodiments, the tube lens 306, fine focus lens 310, and field lens 314 are convex lenses. The tube lens 306 forms an image 308 at a fixed distance in the microscope, for all objectives which are designed to form an image at infinity. The tube lens 306 focuses the light from the objective lens 302 to form a first image 308. The tube lens 306 may not provide any additional magnification. The fine focus lens 310 focuses the image 308 formed by the tube lens 306 onto the field lens 314. The fine focus lens 310 may provide some magnification. For example, according to some embodiments, the fine focus lens is a 10× lens or a 20× lens, though the embodiments of the invention are not limited to these values. According to some embodiments, the fine focus lens 310 provides a magnification between 2× and 100×. According to some embodiments, the fine focus lens 310 provides a magnification between 5× and 40×. The field lens 314 images the fine focus lens 310 on to the eyepiece 316, so that all light passing through the fine focus lens 310 also passes through the eyepiece 316. The field lens 314 may not provide any additional magnification.

The following examples describe some embodiments in more detail. The broad concepts of the current invention are not intended to be limited to the particular examples.

EXAMPLES

Figure 4:
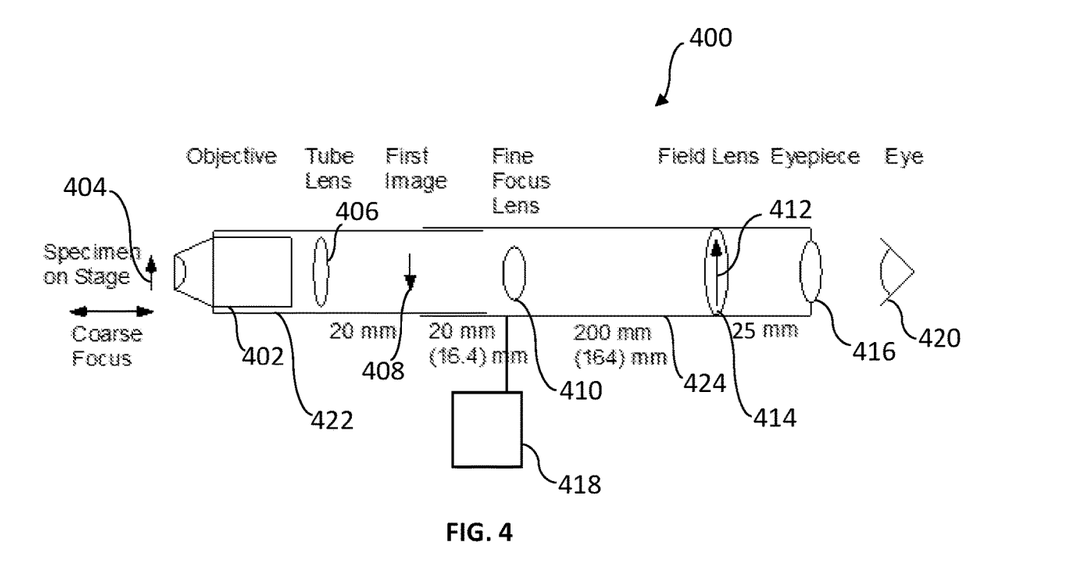
FIG. 4 is a schematic illustration of a fine focus microscope with example dimensions according to some embodiments of the present invention.

A fine focus microscope according to some embodiments of the present invention is shown in FIG. 4. The fine focus microscope 400 comprises similar elements as the fine focus microscope 300 shown in FIG. 3, and like reference numerals are used to refer to like features. In the example shown in FIG. 4, the tube lens 406 has a focal length of 20 mm, and produces a first image 408 at a distance of 20 mm with a magnification of 10× (for a 100× objective lens 402). The fine focus lens 410 produces a second image 412 at the field lens 414 that is 10 times larger than the first image 408, for a total magnification of 100×. For distances of 20 mm and 200 mm, the fine focus lens 410 has a focal length of 18.2 mm. This design resembles the conventional design in that the field lens 414 and the eyepiece 416 are unchanged. However, the overall length of the tube housing the components, for example, the combination of sections 422 and 424, is increased by 40 mm. Alternatively, with distances of 16.4 mm and 164 mm, and a fine focus lens focal length of 14.9 mm, the overall length of the tube 422, 424 is (approximately) maintained.

The fine focus microscope 400 is not limited to the focal length values and distances described above, and other distances and focal lengths may be employed. While there are no theoretical limits to the design, there may be practical limits. The 20 mm tube lens 406 was chosen to accommodate a 10× subsequent magnification by the fine focus lens 410, leading to a 100× gain in focusing sensitivity for a 100× objective lens 402. Other choices are possible, depending on how much focus sensitivity is required at what magnification. For example, the fine focus lens 410 might have conjugate distances of about 16.4 mm and about 164 mm, as shown in FIG. 4. For the case of 10× magnification, which leads to 100× reduction in focus sensitivity, values of the conjugates can range from 10 mm and 100 mm to 30 mm and 300 mm. Depending on the details of the design, this may result in a microscope that is roughly 70 mm shorter to 150 mm longer than a conventional microscope.

For the case of 5× magnification, which leads to 25× reduction in focus sensitivity, conjugate values of about 30 mm and about 150 mm would approximately maintain the length of a conventional microscope. However, other values can be also be used. For example, values of the conjugates can range from 15 mm and 75 mm to 60 mm and 300 mm. For the case of 40× magnification, which leads to a 1600× reduction in focus sensitivity, conjugate values of about 4.4 mm and about 175.6 mm would approximately maintain the length of a conventional microscope. However, the conjugate values in this case could range from about 2.2 mm and 88 mm to about 8.8 mm and about 352 mm.

Decreasing the focal length of the fine focus lens 410 and its conjugate distance places constraints on lens fabrication—and increasing them may make the microscope inconveniently long. As extreme examples, if the conjugate distances for the fine focus lens 410 were reduced from 20 mm and 200 mm to 2 mm and 20 mm, then the fine focus lens 410 would effectively become another costly 100× objective lens (and its 20 mm tube lens). Increasing the conjugate distances from 20 mm and 200 mm to 200 mm and 2000 mm would make the microscope over 2 meters long.

The fine focus lens 410 focuses the second image 412 on the field lens 414. As described above, for the 20 mm and 200 mm embodiment the focal length is unchanged from that in a conventional microscope. It is typically 22.2 mm for the 25 mm eyepiece distance. The function of the field lens 414 is to image the last lens near the objective lens 402 onto the eyepiece lens 416. In a conventional microscope, such as the microscope 100 shown in FIG. 1, the last lens is the tube lens 104 or the objective lens 102. In the fine focus microscope 400 described herein, the last lens is the fine focus lens 410.

According to some embodiments of the invention, the fine focus lens 410 has a focal length of 20 mm and forms an image 412 that is 200 mm distant on the field lens 414. For the 20 mm and 200 mm embodiment, the focal length of the fine focus lens 410 is 18.2 mm. Alternatively, as described above, the fine focus lens 410 may have a focal length of 16.4 mm and may form an image 412 that is 164 mm distant on the field lens 414, maintaining the original overall length of the microscope 100 shown in FIG. 1.

According to some embodiments, the tube encasing the components of the microscope comprises a left hand portion 422 and a right hand portion 424. The left hand portion 422 encloses the objective lens 402 and tube lens 406, while the right hand portion 424 encloses the fine focus lens 410, the field lens 414, and the eyepiece 416. The right hand portion 424 of the microscope 400 can slide inside (or alternatively outside) the left hand portion 422. A positioning system 418 can be used to adjust the position of the right hand portion 424 with respect to the left hand portion 422, effectively adjusting the distance between the fine focus lens 410 and the objective lens 402. According to some embodiments, the positioning system 418 includes a first screw thread disposed on the outside of the left hand portion 422, and a second screw thread disposed on the inside of the right hand portion 424. The right hand portion 424 can be screwed into and out of the left hand portion 422, thereby changing the position of the fine focus lens 410, field lens 414, and eyepiece 416 with respect to the objective lens 402. This can be done without changing the position of the objective lens 402 with respect to the specimen 404. Of course, if the right hand portion 424 slides inside the left hand portion 422, then the respective position of the threads can be reversed.

According to some embodiments, the screw threads disposed on the left hand portion 422 and right hand portion 424 are 1 mm pitch screw threads, with 1 cm useful travel. These values are exemplary, and the embodiments of the invention are not limited to these values. In this example, one full turn corresponds to a 10 μm shift in fine focus. Divided into 100 divisions, each division corresponds to about 0.1 μm. This precise change in position is not possible on a conventional microscope and is less than the diffraction-limited depth of focus. Accordingly, very fine changes in focus can be made by adjusting the position of the fine focus lens 410, field lens 414, and eyepiece 416 with respect to the objective lens 402 using the positioning system 418. Changes in focus larger than 100 μm may be accomplished by the conventional mechanisms for changing the position of the stage, for example, coarse and/or fine focus knobs.

According to some embodiments, the fine focus microscope can include a third portion between the left hand portion 422 and the right had portion 424. One of the joints connecting the portions could be a screw thread, and the other a bearing that rotates but is fixed in position.

According to some embodiments, the left hand portion 422 and right hand portion 424 both have screw threads, but the threads are different. A so-called differential screw arrangement can permit very precise changes in position. Or, one thread can be a left hand thread and the other a right hand thread to make the changes occur faster.

As an alternative to the screw threads, the positioning system 418 can be a rack and pinion system that is used to adjust the position of the fine focus lens 410, field lens 414, and eyepiece 416 with respect to the objective lens 402. Rack and pinion systems are commonly used to adjust the position of the stage with respect to the objective lens in conventional microscopes. In the fine focus microscope 400, the rack and pinion system can include a knob that, when turned, causes the right hand portion 424 to move toward or away from the left hand portion 422, while maintaining a constant distance between the left hand portion 422 and the specimen 404. As will be described in more detail with respect to FIG. 5, small adjustments in focus can be achieved by much larger changes in position of the fine focus lens, significantly decreasing the sensitivity requirements of the rack and pinion system.

The presence of the fine focus lens 410 and the positioning system 420 reduces or even eliminates the need for highly accurate mechanisms for changing the position of the specimen 404 with respect to the objective lens 402. Fine changes in the focus can be made using the positioning system 420, and require a reduced level of accuracy to achieve a given change of focus as compared to that required for a conventional system in which the specimen 404 is moved with respect to the objective lens 402. According to some embodiments, the positioning mechanism can be used to finely focus the image without changing the position of the objective lens 402 with respect to the specimen 404 or the stage on which the specimen 404 rests.

While the embodiments above describe a microscope tube having two portions, a left hand portion 422 and a right hand portion 424, the embodiments of the invention are not limited to this configuration. For example, the objective lens 402, tube lens 406, fine focus lens 410, field lens 414, and eyepiece 416 can be disposed within a single tube, and the positioning system 418 can change the position of the fine focus lens 410, field lens 414, and eyepiece 416 with respect to the objective lens 402 within the single tube.

Figure 5:
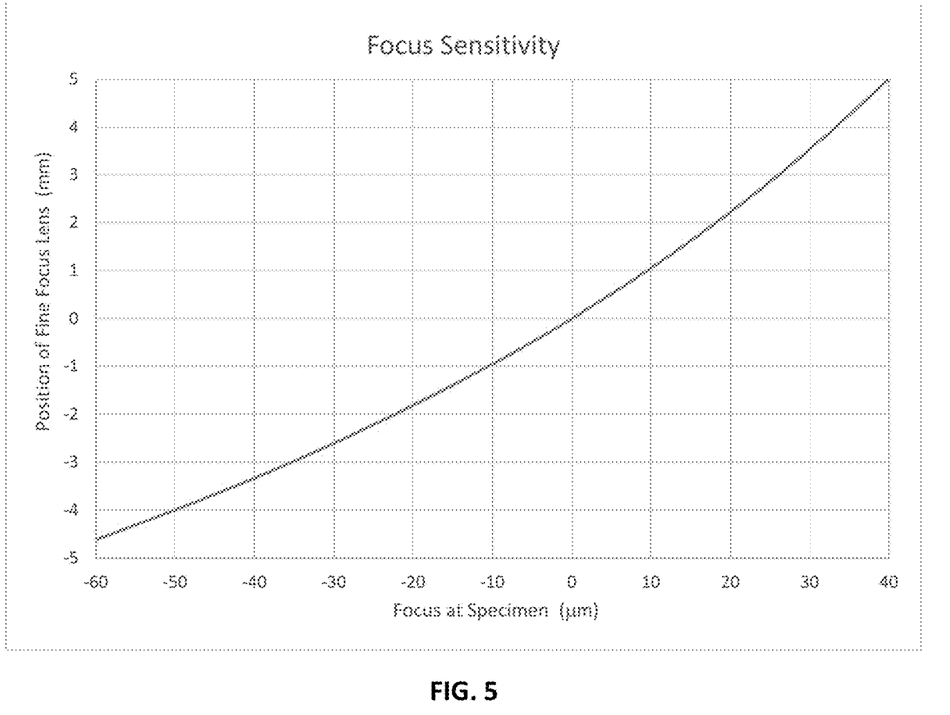
FIG. 5 shows how the focus at the specimen changes for different positions of a 2 mm focal length fine focus lens.
Figure 6:
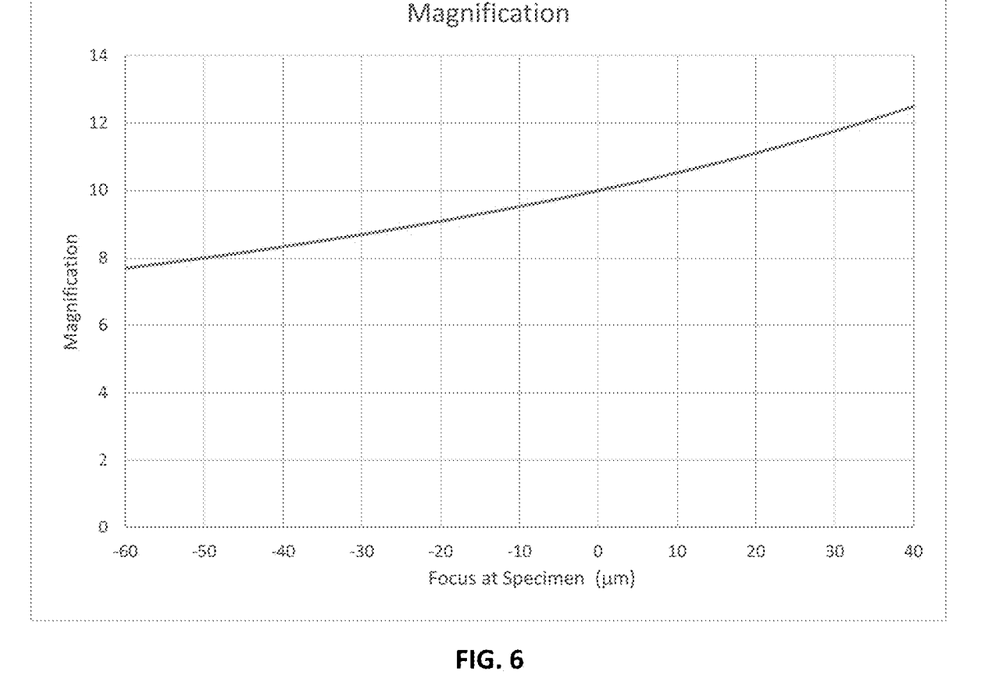
FIG. 6 shows how the magnification depends on the focus at the object of interest.

FIGS. 5 and 6 illustrate how the sensitivity to focus and the magnification change somewhat from their nominal values of 100 and 10×, respectively, at an object distance at the objective lens of 2.2 mm and an objective image distance of 22 mm (see FIG. 2). The position of the fine focus lens and the resulting magnification are shown as functions of the departure in focus at the specimen from the nominal 10× focus at 2.2 mm. FIG. 5 illustrates that a 1 mm change in position of the fine focus lens with respect to the objective lens results in a 10 μm change in focus at the specimen. Accordingly, if a 1 μm change in focus is desired, instead of moving the specimen or objective lens by 1 μm, as would be required in a traditional microscope, the positioning mechanism can move the fine focus lens 100 μm. This movement is therefore 100× less sensitive, and can be easily and cheaply accomplished by the screw thread or rack and pinion systems described above.

FIG. 6 shows how the magnification of the fine focus lens depends on the focus at the object of interest. As shown in FIG. 6, as the fine focus lens moves 1 mm and the focus at the specimen changes by 10 μm, the magnification changes from about 10 to about 10.5. This change in magnification may not be noticeable to a user. However, if a constant magnification is desired, a zoom lens can be used to compensate for the change in magnification.

Figure 7:
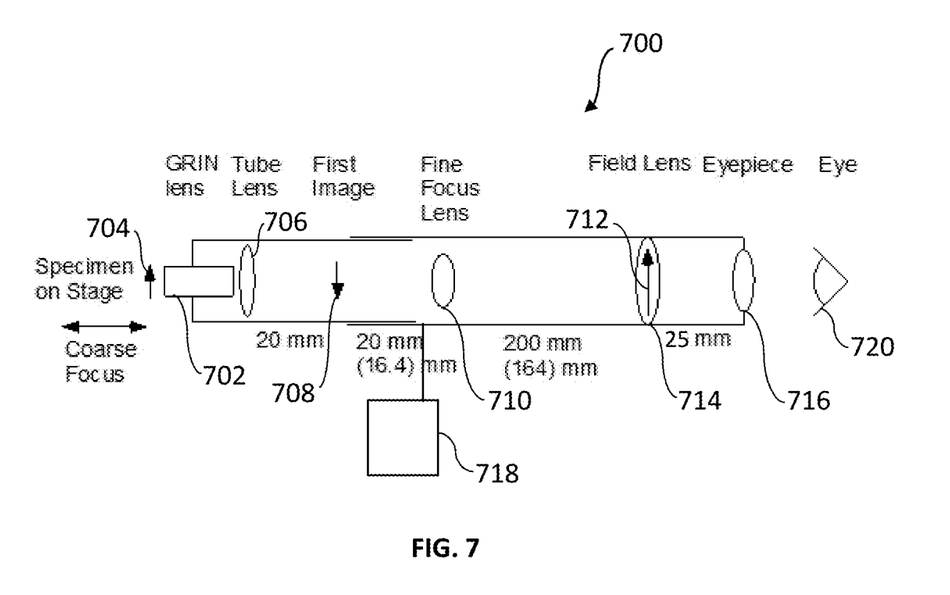
FIG. 7 is a schematic illustration of a fine focus microscope according to some embodiments of the present invention, wherein the objective lens is replaced by a gradient index (GRIN) lens.

FIG. 7 shows an alternative design for a fine focus microscope according to some embodiments of the invention. The fine focus microscope 700 comprises similar elements as the fine focus microscope 400 shown in FIG. 4, and like reference numerals are used to refer to like features. In the example shown in FIG. 7, the objective lens is replaced by a gradient index (GRIN) lens 702. According to some embodiments, the GRIN lens is a cylindrical lens having a position-dependent refractive index. For example, the refractive index of the lens can vary as a function of the radial distance from the center of the lens. According to some embodiments, the GRIN lens 702 is about 2 mm in diameter and is about 5.2 mm long, though these values are exemplary only. The GRIN lens 702 can be designed to focus parallel light entering one face at the opposite face. The tube lens 706, fine focus lens 710, and field lens 714 may be arranged in an optical path of the GRIN lens 702, and the position of the fine focus lens 710 with respect to the tube lens 706 may be adjusted to change the focus of the image 712 at the field lens 714. With either a GRIN lens 702 or any other lens operated at infinite conjugate, there is no preferred location for the tube lens 706. However, positioning the tube lens 706 close to the GRIN lens 702 minimizes vignetting at large fields.

The displacements, magnifications, and focal lengths of the elements of FIGS. 4 and 7 are not meant to be limiting, but are intended to illustrate the general concepts of the invention. Other displacements, magnifications, and focal lengths may be employed. Commercial microscopes typically have a tube length between about 160 mm and 240 mm. This means the stated magnifications of the objectives are correct at this image distance, either from the objective itself, or from the tube lens if present. For a 100× increase in focus sensitivity, the fine focus lens should have a magnification of 10×. Therefore the tube length, defined as the distance between the first image and either the objective or the tube lens if present, should be reduced by a factor of 10. Thus, according to some embodiments, the distance between the objective or the tube lens and the first image is between about 16 mm and about 24 mm. According to some embodiments, the tube length is between about 4 mm and about 50 mm. As described above, for the case of 10× magnification by the fine focus lens, values of the conjugates might range from 10 mm and 100 mm to 30 mm and 300 mm. These values determine the position of the fine focus lens. Of course magnifications other that 10×, resulting in different improvements in focus sensitivity, could also be used, and exemplary conjugates for other magnification are also provided above. These conjugates can be used to determine the position of the fine focus lens for other magnifications. The focus improvement is the square of the magnification, so 10× yields a 100× improvement, 20× yields a 400× improvement, etc. Some embodiments of the invention may not include all of the elements shown in FIGS. 4 and 7. For example, the tube lens may not be included, and the fine focus lens may transfer the image formed by the objective lens to the field lens.

The values provided above are for a 100× objective lens. The system works for lower magnifications, but the sensitivity goes down as the square of the magnification, e.g., for a 50× objective lens each division is 0.4 microns, etc. For a 10× objective lens there is no enhancement—however, the lower the magnification, the less the need for accurate focusing. The system may be used to provide very fine focus control in high end microscopes, or to provide adequate focusing in inexpensive microscopes with lower quality stages. In the example systems shown above, the presence of the fine focus lens results in an upright image. In a conventional microscope the image is disconcertingly inverted 180 degrees. The design of microscope optics is nontrivial. Different manufacturers use different tube lengths, and different methods of correction of chromatic and other aberrations. Operation of the objectives outside their nominal focal range may increase some aberrations. Such manufacturing issues would need to be addressed, especially in high end applications.

The concepts of the present invention may be used to achieve fine focus control in a microscope. A method for fine focus control in a microscope comprising an objective lens, a tube lens, and a field lens includes disposing a fine focus lens between and in an optical path of the tube lens and the field lens. The method further includes adjusting a position of the fine focus lens, the field lens, and the eyepiece at least one of farther away from or closer to the tube lens to change a focus of an image formed at the eyepiece.

The concepts of the present application can also be applied to a probe that may be used for surface-enhanced Raman spectroscopy. Conventional Raman scattering is a well-known technique for detecting and identifying complex molecular samples. In surface-enhanced Raman scattering, positioning a nano-rough metallic surface close to the sample enormously enhances the Raman signal. The nano-rough metallic may comprise gold, silver, aluminum, or other metals. The metallic surface comprises a thin layer of gold deposited on a rough transparent epoxy substrate. The advantage of the clear substrate is that the Raman signal could be obtained by passing light through the substrate and onto opaque samples simply placed against its surface. In the present application a commercially available Raman spectrometer is coupled to a distant probe. Raman signals are obtained from the surface, and from the interior, of a solid specimen located more than 1 meter away from the spectrometer. The practical advantage of this arrangement is that it opens up surface-enhanced Raman spectroscopy to a clinical environment, with a patient simply sitting or lying near the spectrometer.

Figures 8A, 8B:
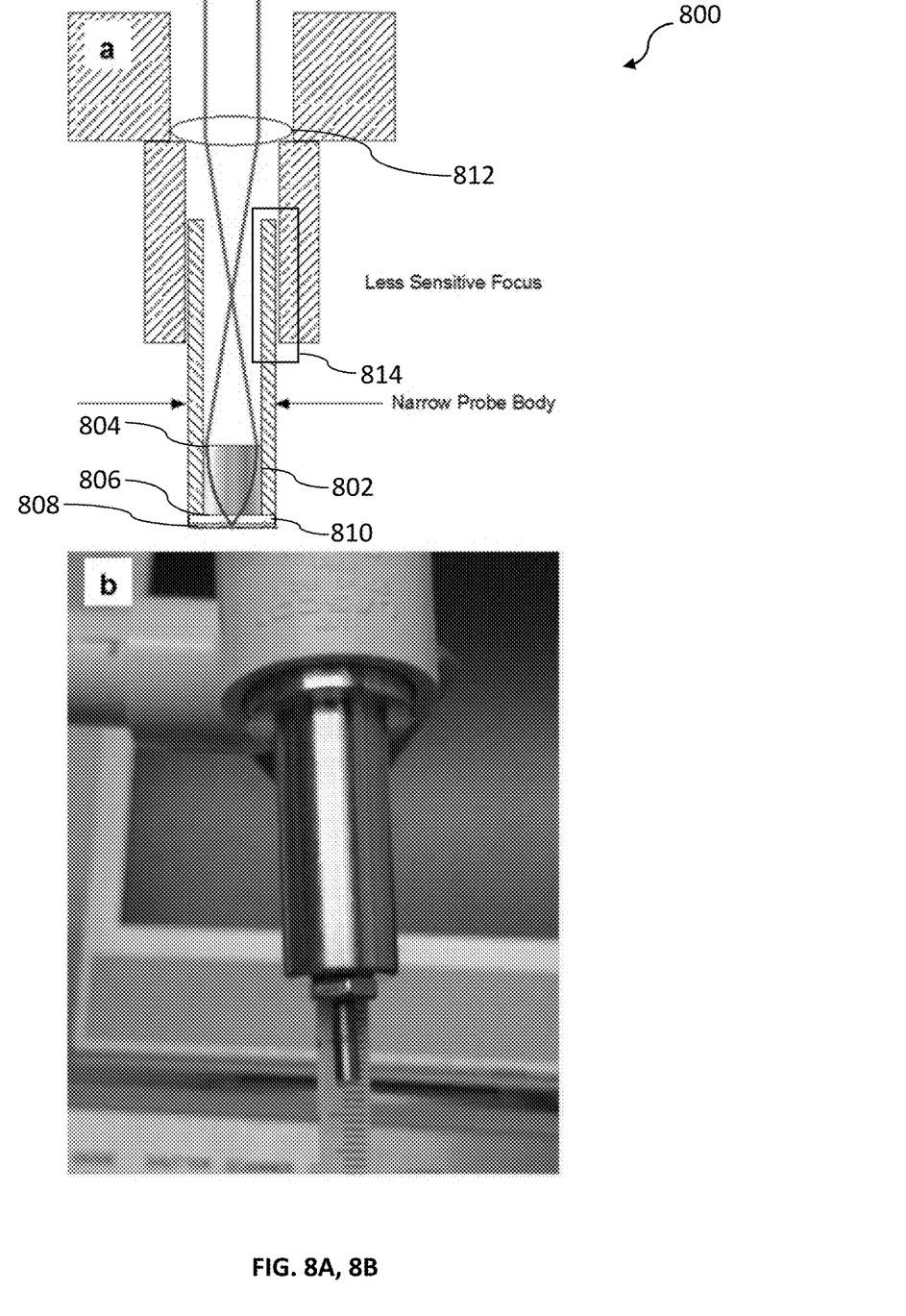
FIG. 8A shows a schematic illustration of a probe for surface-enhanced Raman spectroscopy with a fine focus lens.
FIG. 8B is a photograph of a probe for surface-enhanced Raman spectroscopy.

FIGS. 8A and 8B show a schematic illustration and photograph, respectively, of a probe for surface-enhanced Raman spectroscopy. The LabRAM spectrometer uses a He—Ne laser at a wavelength of 633 nm. When a microscope objective lens is removed the light exits as a nearly parallel beam, as illustrated in FIG. 8A. A GRIN lens is placed in an optical path of the light. A light beam incident on a GRIN lens follows a sinusoidal path within the lens. GRIN lenses are specified by the length, in radians, of the sinusoidal path.

A Raman spectroscopy probe according to some embodiments of the invention is shown in FIG. 8A. The Raman spectroscopy probe 800 comprises a gradient-index (GRIN) lens 802 having a proximal end 804 and a distal end 806, a rough metallic surface 808 spaced apart from the distal end 806 of the GRIN lens 802 and in an optical path of the GRIN lens 802, and a transparent substrate 810 disposed between the distal end 806 of the GRIN lens 802 and the rough metallic surface 808 to maintain a distance from the distal end 806 of the GRIN lens 802 to the rough metallic surface 808. A fine focus lens 812 is spaced apart from the proximal end 804 of the GRIN lens 802, and a change in position of the fine focus lens 812 provides a change in focus of light at the rough metallic surface 808. The Raman spectroscopy probe can further include a positioning system 814 for changing the position of the fine focus lens 812 with respect to the GRIN lens 802. The positioning system can comprise two tubes having threads that can be screwed into each other, or a rack and pinion system. Other positioning systems known in the art can also be used.

Figure 9:
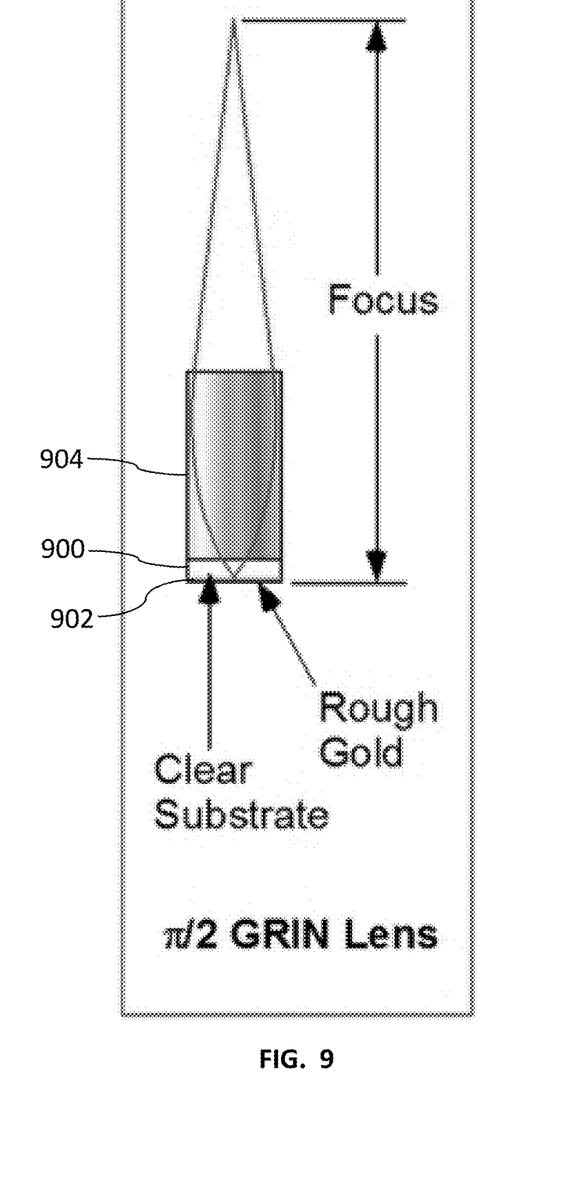
FIG. 9 shows a schematic illustration of a probe for surface-enhanced Raman spectroscopy with a rough gold surface bonded via a clear substrate spacer directly to a GRIN lens.
Figure 10:
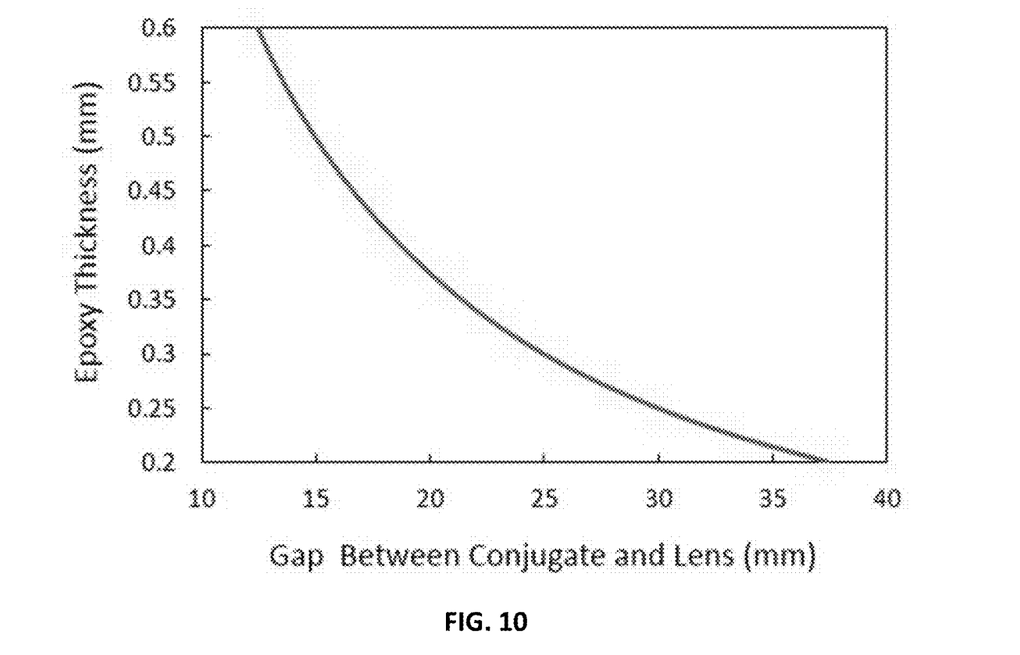
FIG. 10 shows the depth of the epoxy substrate through which the light is focused as a function of the distance from the back conjugate to the lens according to some embodiments of the invention.

According to some embodiments of the invention, the GRIN lens 802 is a $\pi/2$ GRIN lens. Parallel light incident on a $\pi/2$ GRIN lens will be focused onto the back surface of the lens. As shown in FIG. 9, according to some embodiments of the invention, a transparent epoxy substrate 900 carrying a 20 nm thick rough gold film 902 is bonded directly to the back surface of the GRIN lens 904. Other thickness of the rough metallic film may be employed, including thicknesses up to 50 nm. Much thicker films became uniform and produced a very small Raman signal. In principle any transparent solid material can be used instead of the epoxy substrate 900, including a clear resin, but the advantage of the epoxy is that it produces very little background Raman signal. The addition of the transparent epoxy substrate 900 has negligible effect on the surface-enhanced Raman scattering. For the thickness of the substrate used, about 0.4 mm, the optical conjugate to the gold surface is approximately 1.7 cm upstream of the GRIN lens (FIG. 10). A thinner substrate may be used. The substrate may also be thicker, though this may reduce the numerical aperture of the GRIN lens combination, reducing the signal strength.

As described above, parallel light entering a $\pi/2$ GRIN lens is focused at the far surface of the lens. For surface-enhanced Raman scattering to occur, however, the light should instead be focused on the rough gold surface adhered to the transparent epoxy substrate, which may be beyond the distal end of the GRIN lens. To adjust the focus, an additional lens, referred to herein as the fine focus lens, is placed in the optical path of the GRIN lens, on the proximal side of the lens. The fine focus lens focuses the light such that the rays reaching the GRIN lens in FIG. 9 are no longer parallel, as shown in FIG. 8A. The position of the fine focus lens 812 in FIG. 8A can be adjusted to ensure that the light passing through the GRIN lens 802 is focused on the rough gold surface 808. The large axial magnification simplifies precise focusing of light on the gold surface 808 while the epoxy 810 provides the robust structure needed to support insertion of the probe 800 into solid specimens. The concepts illustrated in FIG. 2 can be applied to the Raman spectroscopy probe 800. A small change in focus at the rough metal surface 808 is accomplished by a larger change in the distance between the GRIN lens 802 and the fine focus lens 812.

As shown in FIG. 8B, because the fine focusing lens is spaced apart from the GRIN lens, the distal end of the probe can be very narrow, on the order of a few millimeters. While some embodiments of the present application include a 2 mm diameter GRIN lens inside a stainless steel tube that is 3 mm outside diameter, narrower GRIN lenses and tubes may be used. The narrower tube allows procedures utilizing the endoscope to be less invasive. Locating the focusing mechanism apart from the probe tip minimizes the diameter of the probe tip. FIG. 10 shows the depth of the epoxy substrate through which the light is focused as a function of the distance from the back conjugate to the lens. The focusing range is well within the variation in thickness of the epoxy substrate.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A fine focus microscope comprising:
   an objective lens that collects light from an object being imaged;
   a tube lens that forms a first image from light received from said objective lens;
   a fine focus lens located between the tube lens and an eyepiece, wherein the fine focus lens forms a second image from said first image;
   wherein the eyepiece forms a third image from said second image, wherein said third image is viewable by a user;
   a field lens directs light from said second image to said eyepiece;
   a positioning system mechanically coupled to said fine focus lens, said eyepiece, and said field lens;
   a tube, wherein said objective lens, tube lens, fine focus lens, field lens, and eyepiece are disposed within said tube,
   wherein said positioning system changes a position of said fine focus lens, said eyepiece, and said field lens with respect to the first image to provide a change in focus of said object being imaged while a position of the objective lens is unchanged; and
   wherein said fine focus lens provides a magnification between 2X and 100X.

2. The fine focus microscope of claim 1, wherein the positioning system is a rack and pinion positioning system.

3. The fine focus microscope of claim 1, wherein said objective lens provides a 100X magnification, and wherein a 1 mm change in position of said fine focus lens provides a 10 μm change in focus.

4. The fine focus microscope of claim 1, wherein said objective lens provides a 50X magnification, and wherein a 1 mm change in position of said fine focus lens provides a 40 μm change in focus.

5. The fine focus microscope of claim 1, wherein said tube comprises a first tube and a second tube, wherein
   said objective lens and said tube lens are disposed within said first tube and
   said fine focus lens, said field lens, and said eyepiece are disposed within said second tube,
   wherein an end of said first tube is slideably disposed within an end of said second tube.

6. The fine focus microscope of claim 5, wherein said positioning system comprises a first screw thread disposed on an outside surface of one of said first tube or said second tube, and a second screw thread disposed on an inside surface of the other one of said first tube or said second tube, wherein said positioning system changes said position of said fine focus lens, said eyepiece, and said field lens by adjusting an amount that one of said first tube or said second tube having a screw thread disposed on said outside surface is screwed into said other one of said first tube or said second tube.

7. A fine focus microscope comprising:
   a gradient-index (GRIN) lens collects light from an object being imaged;
   a tube lens for forming forms a first image from light received from said GRIN lens;
   a fine focus lens located between the tube lens and an eyepiece, wherein the fine focus lens is forms a second image from said first image;
   the eyepiece forms a third image from said second image, wherein said third image is viewable by a user;
   a field lens that directs light from said second image to said eyepiece;
   a positioning system in mechanical connection with said fine focus lens, said eyepiece, and said field lens;
   a tube, wherein said GRIN lens, tube lens, fine focus lens, field lens, and eyepiece are disposed within said tube;
   wherein said positioning system changes a position of said fine focus lens, said eyepiece, and said field lens with respect to the first image to provide a change in focus at said eyepiece of said object being imaged while a position of the objective lens is unchanged; and
   wherein said fine focus lens provides a magnification between 2X and 100X.

* * * * *